United States Patent
Chauhan et al.

(10) Patent No.: US 12,549,196 B2
(45) Date of Patent: Feb. 10, 2026

(54) SYSTEMS AND METHODS FOR DYNAMICALLY GENERATING AND MAPPING UNICODE FOR CROSS-DISTRIBUTED NETWORK DATA TRANSMISSIONS

(71) Applicant: BANK OF AMERICA CORPORATION, Charlotte, NC (US)

(72) Inventors: Sandeep Kumar Chauhan, Telangana (IN); Saurabh Arora, Haryana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 98 days.

(21) Appl. No.: 18/643,252

(22) Filed: Apr. 23, 2024

(65) Prior Publication Data

US 2025/0330197 A1    Oct. 23, 2025

(51) Int. Cl.
H03M 7/30    (2006.01)

(52) U.S. Cl.
CPC ......... *H03M 7/3066* (2013.01); *H03M 7/705* (2013.01)

(58) Field of Classification Search
CPC ....... H03M 7/30; H03M 7/3066; H03M 7/705
See application file for complete search history.

(56) References Cited

U.S. PATENT DOCUMENTS

| | | | | |
|---|---|---|---|---|
| 5,793,381 A * | 8/1998 | Edberg | ................ | G06F 40/154 704/8 |
| 7,086,004 B2 * | 8/2006 | Atkin | ................ | G06F 16/9558 707/E17.118 |
| 7,251,667 B2 * | 7/2007 | Atkin | ................ | G06F 40/109 |
| 7,278,100 B1 * | 10/2007 | Ehrman | ................ | G06F 40/126 704/7 |
| 7,940,273 B2 * | 5/2011 | Gurcan | ................ | G06F 40/126 345/947 |
| 7,999,705 B2 * | 8/2011 | Schneider | ................ | H03M 7/40 341/51 |
| 10,671,315 B2 | 6/2020 | Sanghvi | | |

(Continued)

FOREIGN PATENT DOCUMENTS

| | | |
|---|---|---|
| CN | 111191286 B | 9/2020 |
| CN | 108595157 B | 5/2022 |

*Primary Examiner* — Lam T Mai
(74) *Attorney, Agent, or Firm* — Moore & Van Allen PLLC; Lauren M. Stokes

(57) ABSTRACT

Systems, computer program products, and methods are described herein for generating and mapping unicode for cross-distributed network data transmissions. The present disclosure is configured to identify a cross-distributed network data transmission comprising source ledger code; generate a core schema for a destination ledger, wherein the destination ledger is based on data of the cross-distributed network data transmission; generate, by a ledger transformation module, a data dictionary, wherein the ledger transformation module receives ledger code from a large language model (LLM); generate code mapping instructions for the cross-distributed network data transmission based on the core schema for the destination ledger; convert the source ledger code to a unicode; receive, by a receiver schema mapping module, the unicode and the code mapping instructions; and generate, by the receiver schema mapping module, an intermediary ledger comprising the unicode and based on the code mapping instructions.

20 Claims, 6 Drawing Sheets

(56) References Cited

U.S. PATENT DOCUMENTS

| | | |
|---|---|---|
| 10,713,239 B2 | 7/2020 | Qiu |
| 10,924,264 B2 | 2/2021 | Wilson |
| 10,938,548 B2 | 3/2021 | Mercuri |
| 10,956,075 B2 | 3/2021 | Kursun |
| 11,032,293 B2 | 6/2021 | Biyani |
| 11,126,683 B2 | 9/2021 | Lu |
| 11,128,528 B2 | 9/2021 | Nolan |
| 11,159,620 B2 | 10/2021 | Wang |
| 11,449,476 B2 | 9/2022 | Oberhofer |
| 11,481,509 B1 | 10/2022 | Prasad |
| 11,848,939 B2 | 12/2023 | Biyani |
| 12,010,244 B2 | 6/2024 | Androulaki |
| 2002/0052902 A1* | 5/2002 | Bauer ............... G06F 40/126 715/256 |
| 2004/0006569 A1* | 1/2004 | Carlin ................. H03M 7/30 |
| 2004/0237046 A1* | 11/2004 | Burchall ........... G06F 40/126 715/256 |
| 2007/0115488 A1* | 5/2007 | Engelman .......... G06F 40/109 358/1.11 |
| 2009/0055395 A1* | 2/2009 | Jenks ................. G06F 16/84 |
| 2011/0129086 A1* | 6/2011 | Schneider ........... H04L 9/065 380/42 |
| 2017/0243193 A1 | 8/2017 | Manian |
| 2018/0025435 A1 | 1/2018 | Karame |
| 2018/0165476 A1 | 6/2018 | Carey |
| 2020/0336542 A1 | 10/2020 | Wang |
| 2022/0200973 A1 | 6/2022 | Tola |

* cited by examiner

SYSTEMS AND METHODS FOR DYNAMICALLY GENERATING AND MAPPING UNICODE FOR CROSS-DISTRIBUTED NETWORK DATA TRANSMISSIONS

TECHNOLOGICAL FIELD

Example embodiments of the present disclosure relate to dynamically generating and mapping unicode for cross-distributed network data transmissions.

BACKGROUND

In cross-distributed networks comprising data transmissions of different distributed ledgers and their associated schemas and data codes, there often arises the issue of automatically, dynamically, and efficiently converting the distributed ledgers with their associated data to a readable and format for a destination system and their destination distributed ledger. For instance, and with new distributed ledger technologies constantly changing and updating, there is a continuous and recurring need to update codebases to map to the latest data structures within the distributed ledgers. Thus, there exists a need for a system, computer program product, and/or computer-implemented method that can automatically, efficiently, and dynamically generate and map unicode for cross-distributed network data transmissions.

Applicant has identified a number of deficiencies and problems associated with cross-distributed data transmissions where new schemas and other such technical features are introduced within the distributed ledgers. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for dynamically generating and mapping unicode for cross-distributed network data transmissions.

In one aspect, a system for dynamically generating and mapping Unicode for cross-distributed network data transmissions is provided. In some embodiments, the system may comprise: a processing device; a non-transitory storage device containing instructions when executed by the processing device, causes the processing device to perform the steps of: identify a cross-distributed network data transmission comprising source ledger code; generate a core schema for a destination ledger, wherein the destination ledger is based on data of the cross-distributed network data transmission; generate, by a ledger transformation module, a data dictionary, wherein the ledger transformation module receives ledger code from a large language model (LLM); generate code mapping instructions for the cross-distributed network data transmission based on the core schema for the destination ledger; convert the source ledger code to a unicode; receive, by a receiver schema mapping module, the unicode and the code mapping instructions; and generate, by the receiver schema mapping module, an intermediary ledger comprising the unicode and based on the code mapping instructions.

In some embodiments, the cross-distributed network data transmission is between a source ledger and the destination ledger, and wherein the source ledger and the destination ledger comprise different schemas. In some embodiments, the processing device is further configured to perform the steps of determining whether a source ledger schema and a destination ledger schema are compatible.

In some embodiments, the processing device is further configured to perform the steps of identifying whether the cross-distributed network data transmission is an internal data category or an external data category. In some embodiments, and in an instance where the cross-distributed network data transmission is the internal data category, and wherein the processing device is further configured to perform the steps of performing a local conversion of the source ledger code using the ledger transformation module comprising the code mapping instructions.

In some embodiments, the LLM comprises current data associated with a plurality of entity ledgers and different schemas.

In some embodiments, the intermediary ledger comprises an intermediary schema and the unicode that can be mapped to a destination schema and destination ledger code.

Similarly, and as a person of skill in the art will understand, each of the features, functions, and advantages provided herein with respect to the system disclosed hereinabove may additionally be provided with respect to a computer-implemented method and computer program product. Such embodiments are provided for exemplary purposes below and are not intended to be limited.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
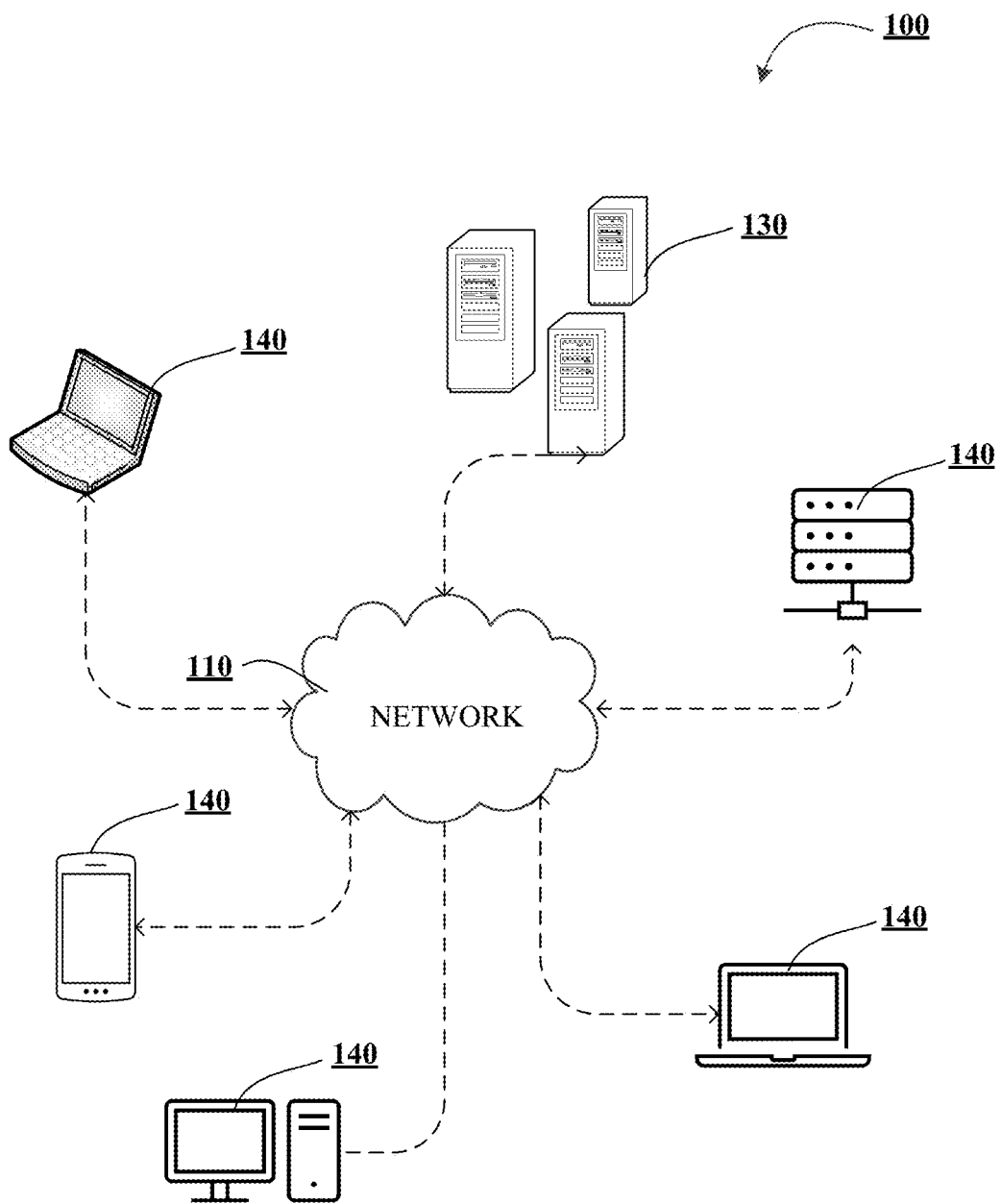
Figure 1B:
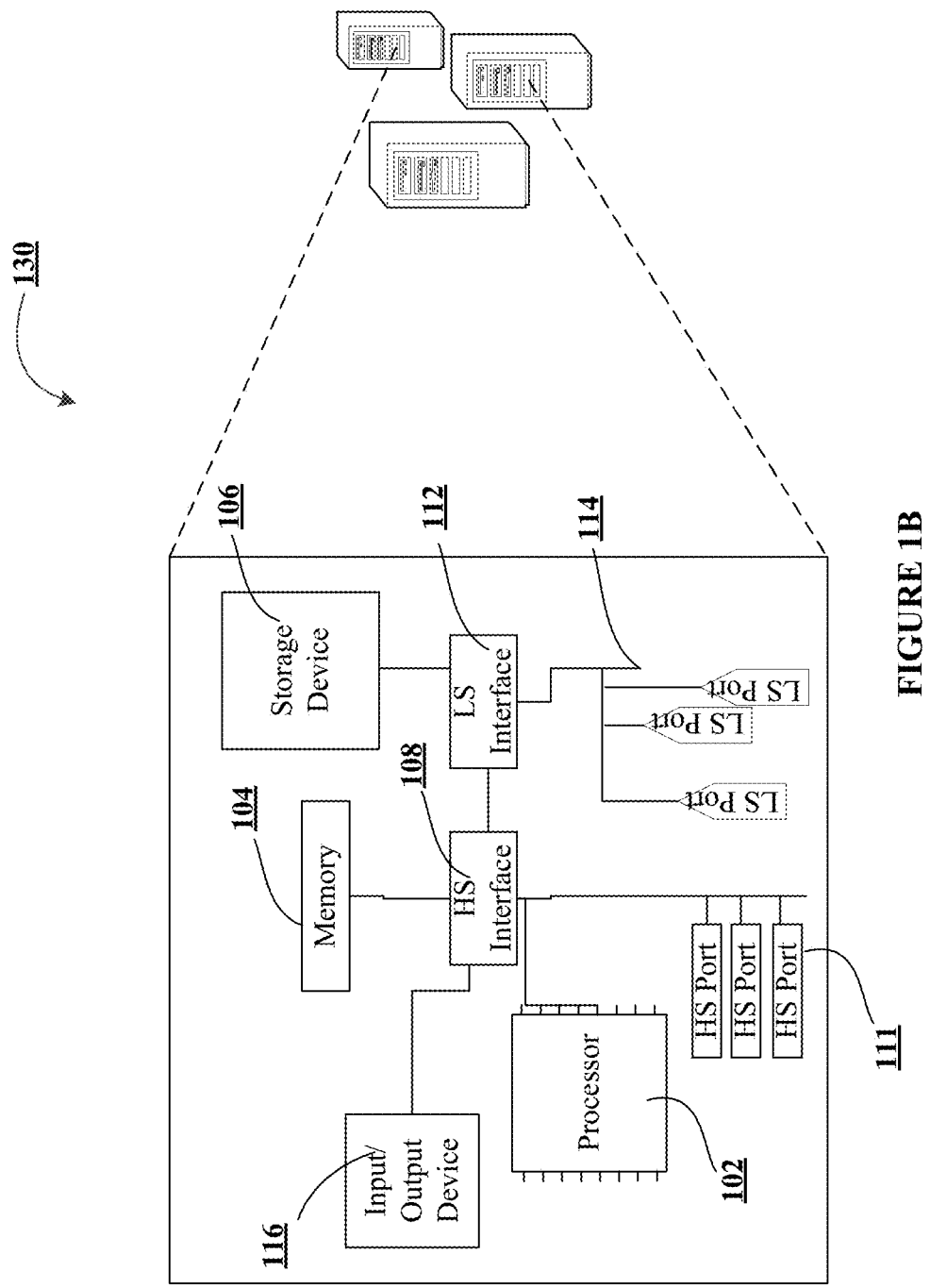
Figure 1C:
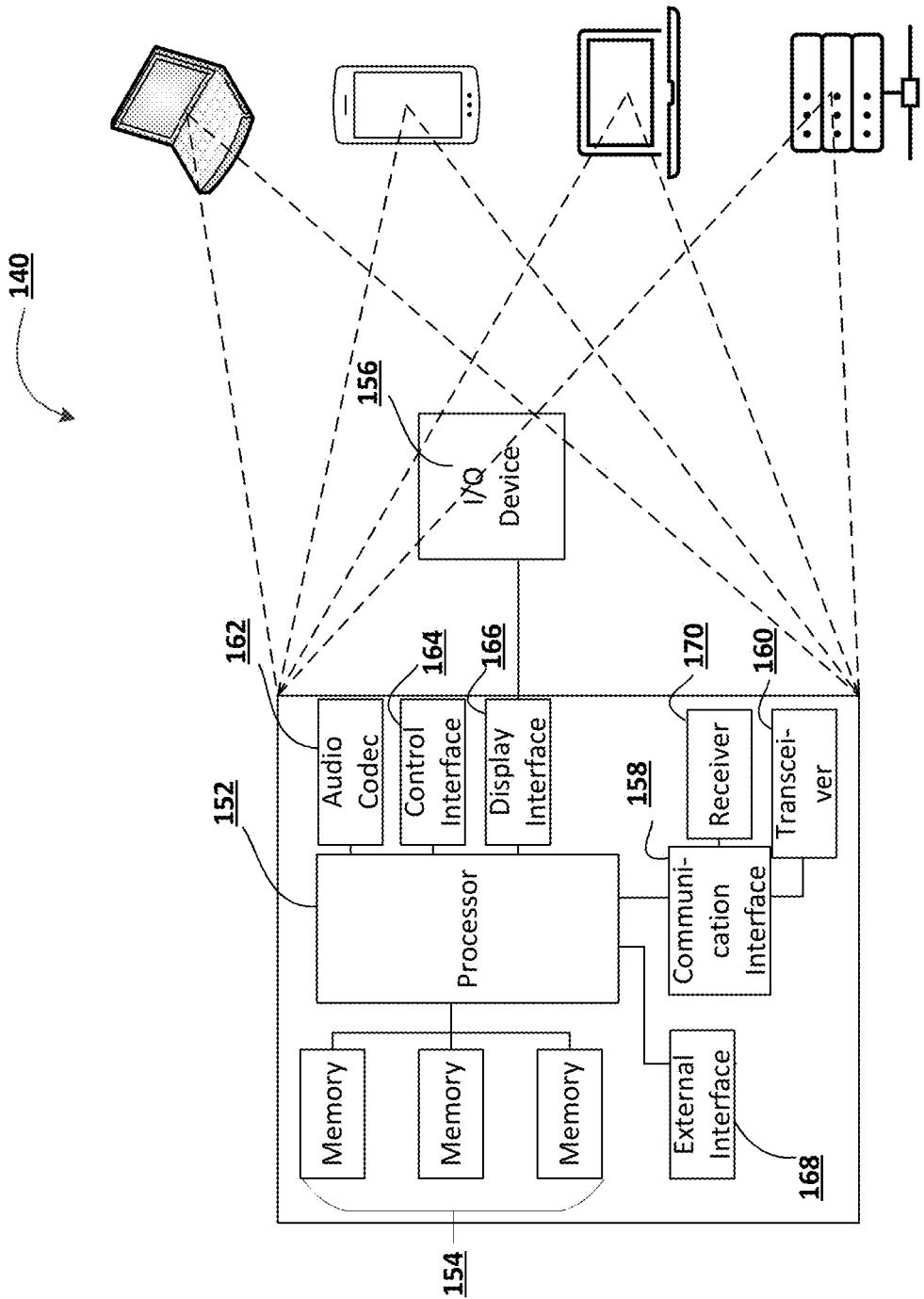
Figure 2:
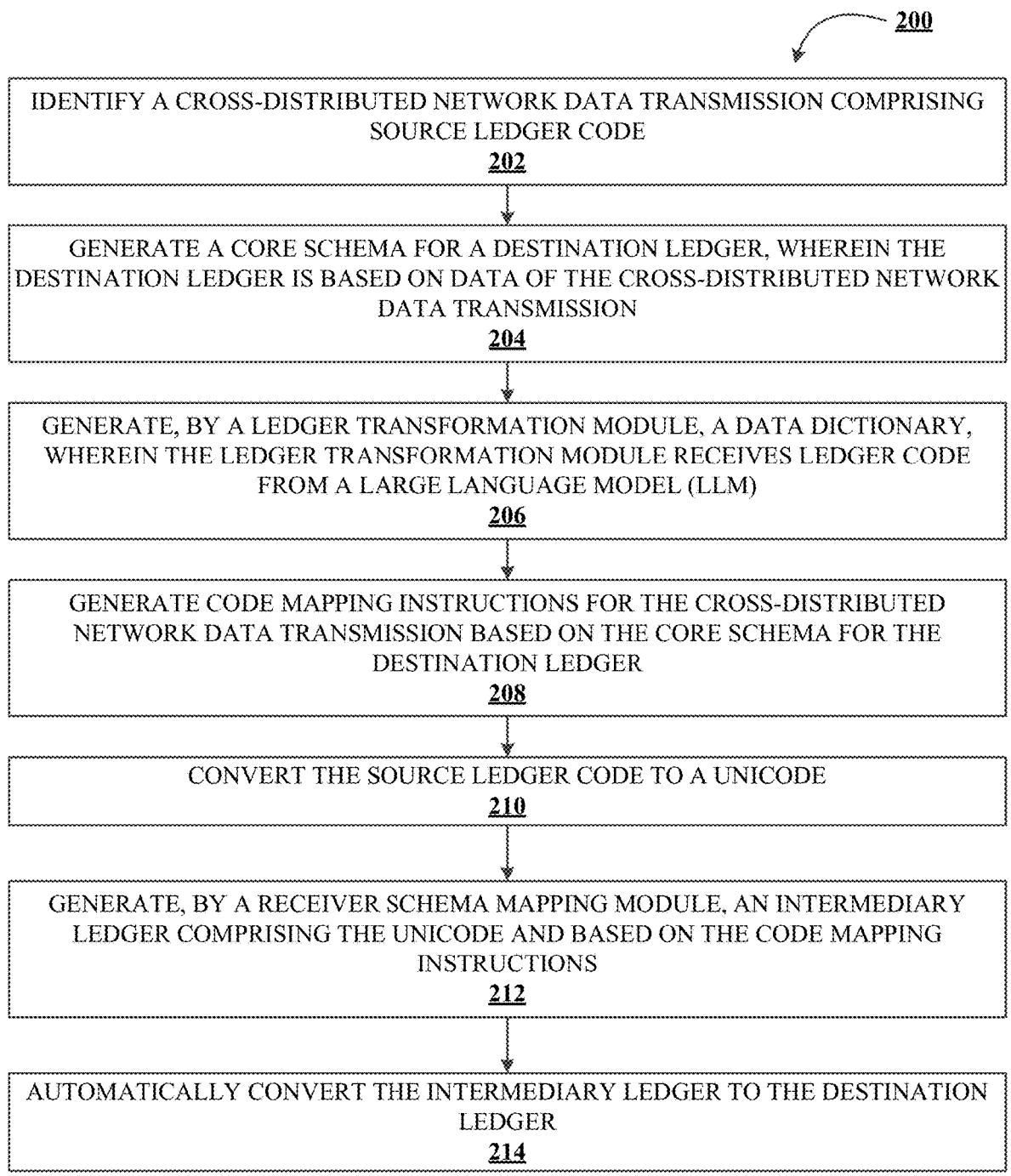
Figure 3:
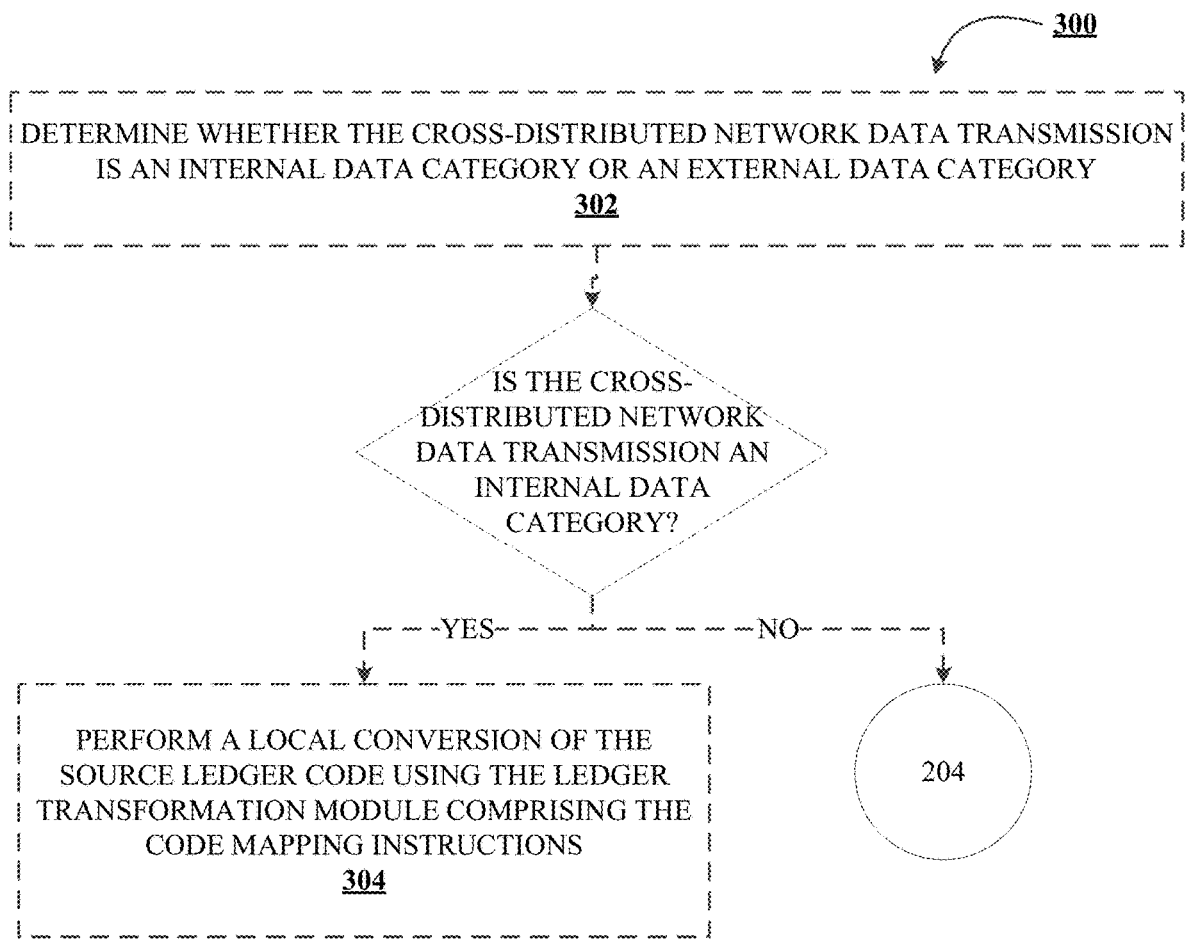
Figure 4:
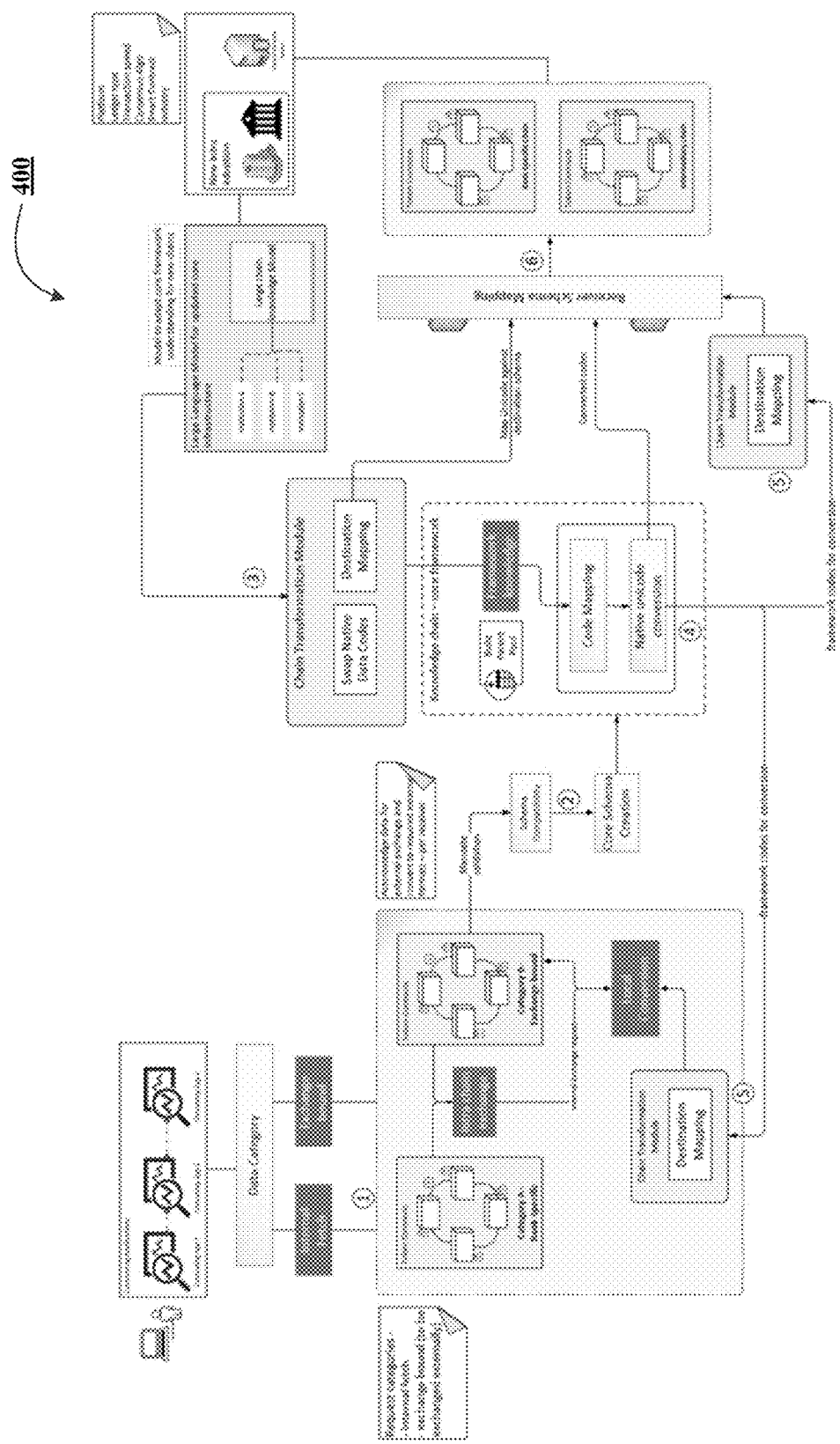

FIGS. 1A-1C illustrates technical components of an exemplary distributed computing environment for dynamically generating and mapping unicode for cross-distributed network data transmissions, in accordance with an embodiment of the disclosure;

FIG. 2 illustrates a process flow for dynamically generating and mapping unicode for cross-distributed network data transmissions, in accordance with an embodiment of the disclosure;

FIG. 3 illustrates a process flow for determining whether the cross-distributed network data transmission is internal or external and the conversion of the source ledger code based on the determination, in accordance with an embodiment of the disclosure; and FIG. 4 illustrates an exemplary architecture flow for dynamically generate and map unicode for cross-distributed network data transmissions.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

In cross-distributed networks comprising data transmissions of different distributed ledgers and their associated schemas and data codes, there often arises the issue of automatically, dynamically, and efficiently converting the distributed ledgers with their associated data to a readable and format for a destination system and their destination distributed ledger. For instance, and with new distributed ledger technologies constantly changing and updating, there is a continuous and recurring need to update codebases to map to the latest data structures within the distributed ledgers. Thus, there exists a need for a system, computer program product, and/or computer-implemented method that can automatically, efficiently, and dynamically generate and map unicode for cross-distributed network data transmissions.

Accordingly, the present disclosure provides for an identification of a cross-distributed network data transmission comprising source ledger code; a generation of a core schema for a destination ledger, wherein the destination ledger is based on data of the cross-distributed network data transmission; a generation, by a ledger transformation module, of a data dictionary, wherein the ledger transformation module receives ledger code from a large language model (LLM); and a generation of code mapping instructions for the cross-distributed network data transmission based on the core schema for the destination ledger. Additionally, the disclosure further provides for a conversion of the source ledger code to a unicode; a receipt, by a receiver schema mapping module, of the unicode and the code mapping instructions; and a generation, by the receiver schema mapping module, of an intermediary ledger comprising the unicode and based on the code mapping instructions.

In other words, the disclosure provides a system that can learn core data codes and structure for every new blockchain framework such that efficient and dynamic exchanges between systems and blockchain frameworks within an internal system and between internal and external systems. The system does so by categorizing data into an internal data (e.g., internal to an entity and/or a network) and external data (e.g., external to the entity/network), and based on this categorization, the subsequent steps may change. For instance, and where the categorization comprises external data, the system may determine whether the schemas between the external data and the receiving system are compatible and core schema creation for recipient system is triggered. Additionally, a data dictionary is initiated which uses an LLM to learn different and new blockchain data codebases, whereby the dictionary allows for a swap of native data codes for transforming the initial data to the Unicode and to determine destination mapping. The LLM may continuously run in the background to determine when new schemas, blockchain codebases, and/or the like, are created and used in different networks. The Unicode may be mapped (using destination mapping) against the destination schema to create a recipient schema mapping to convert the initial external data schema to an intermediary chain that can map between the external and internal chains, while still maintaining independence between the two.

What is more, the present disclosure provides a technical solution to a technical problem. As described herein, the technical problem includes cross-distributed data transmissions where new schemas are introduced within the distributed ledgers. The technical solution presented herein allows for generating and mapping unicode for cross-distributed network data transmissions. In particular, the disclosure provided herein is an improvement over existing solutions to the cross-distributed network data transmissions comprising different schemas and codebases, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for generating and mapping unicode for cross-distributed network data transmissions 100, in accordance with an embodiment of the invention. As shown in FIG. 1A, the distributed computing environment 100 contemplated herein may include a system 130 (i.e., a system like that described herein), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for dynamically generating and mapping unicode for cross-distributed network data transmissions, in accordance with an embodiment of the disclosure. In some embodiments, a system (e.g., similar to one or more of the systems described herein with respect to FIGS. 1A-1C) may perform one or more of the steps of process flow 200. For example, a system (e.g., the system 130 described herein with respect to FIG. 1A-1C) may perform the steps of process flow 200.

As shown in block 202, the process flow 200 may include the step of identifying a cross-distributed network data transmission comprising source ledger code.

cross-distributed network data transmission=may comprise a transmission of a distributed ledger from inside a network (e.g., an internal network communication comprising a distributed ledger) to another internal network destination, whereby the transmitted distributed ledger comprises a different format, schema, language, and/or the like, from the internal network destination (and the destination's distributed ledger(s)). Additionally, the cross-distributed network data transmission may comprise an external data exchange which comprises a transmission of a distributed ledger from outside a destination network to the destination network comprising distributed ledgers of a different format, schema, language, and/or the like. In this manner, the cross-distributed network data transmission comprises a data packet (such as a block within a distributed ledger) comprising data of a particular format, protocols, language, schema, and/or the like, which cannot be converted within the data packet itself, but may need to be based on its destination (e.g., a receiving network or entity comprising a different format, language, schema, and/or the like for its data packets and/or blocks within its distributed ledgers). Thus, the cross-distributed network data transmission comprises a source data transmission (such as a source ledger transmitted from a source application, source network, and/or the like) which is not readily configurable for its identified destination or understandable by the identified destination. Therefore, a process that is able to configure and allow an understanding by the destination is provided herein, such as by generating a unicode to convert the source ledger and its data to an understandable configuration for the destination. Such a process(es) is described in further detail herein.

For example, and in other words, the cross-distributed network data transmission may be between a source ledger and a destination ledger, wherein the source ledger and the destination ledger comprise different schemas. Such different schemas may define the organization of the data within the ledgers, such as an organization and/or relationships of the underlying data structure for the data of the source ledger and the destination ledger.

In some embodiments, the identification of the cross-distributed network data transmission may be based on an update to an application (such as a source application that provides data to other downstream applications) which configures the application to a new language, protocol(s), schema, format, and/or the like, whereby the update is not carried out to other downstream applications. In this example embodiment, the system may identify the cross-distributed network data transmission when a new data transmission from the updated source application is transmitted to a downstream application and the downstream application cannot carry out its purpose or understand the underlying data of the transmission. Similarly, and in some embodiments, the system may identify the cross-distributed network data transmissions by a trigger occurring to generate a new block within the source ledger (such as by a smart contract action) which leads to new recordation and/or generation of data within the source ledger, whereby the data within the block may not be understood by a destination ledger when the source ledger (and/or the block, itself) is transmitted to the destination ledger.

The process described herein may comprise a step of determining whether a source ledger schema and a destination ledger schema are compatible. Such a process may occur after the cross-distributed network data transmission is identified. In some embodiments, the process of determining whether the source ledger schema and destination ledger schema may occur after the system has determined whether the cross-distributed network data transmission is an external data category (e.g., indicating that the source ledger has been transmitted outside a network, such as transmitted from outside a destination network and/or being transmitted to an outside destination network). Such a determination, in some embodiments, may occur before allowing the process to proceed to the step of block 204 described below.

As shown in block 204, the process flow 200 may include the step of generating a core schema for a destination ledger, wherein the destination ledger is based on data of the cross-distributed network data transmission. For example, the system may determine an underlying framework that can be used for converting the data of the source ledger to the destination ledger. By way of non-limiting example, and if the source ledger were compared to a language such as Spanish, and the destination ledger were compared to a language such as English, then the underlying framework may be the underlying alphabet and/or underlying framework of creating words with the same basic alphabet. Similarly, and by way of example, where the source ledger comprises computing language A (e.g., Python, and/or the like) and destination ledger comprises computing language B (e.g., Java, and/or the like), then the underlying framework may comprise the shared binary language which is shared among the two different types of computing languages and all other such types of computing languages. Thus, and in this manner, the core schema for the destination ledger may be based on shared features and/or characteristics between the source ledger and the destination ledger, which may be used to create a method for converting the source ledger data to an understandable framework for the destination ledger to understand and process the source ledger data without losing the data itself or the organization of the data.

Therefore, and in some embodiments and based on this description, the core schema may be based on the source ledger of the cross-distributed network data transmission and the destination ledger, and the associated data of each (e.g., language, format, schema, protocols, and/or the like). Similarly, and while not described explicitly herein, the examples provided above with respect to generating the core schema based on the underlying framework between distributed ledgers is likewise used for determining the underlying frameworks between different formats, schemas, protocols, and/or the like. In such embodiments, similar procedures may be followed for determining each of these underlying frameworks to generate the core schema as well.

As shown in block 206, the process flow 200 may include the step of generating, by a ledger transformation module, a data dictionary, wherein the ledger transformation module receives ledger code from a large language model (LLM). For example, the system may generate a data dictionary for converting the source ledger to the destination ledger, based on converting the source ledger data to a unicode. Therefore, the data dictionary may comprise a collection of different schemas, formats, languages, protocols, and/or the like that the system has collected historically and/or currently for understanding and mapping the current distributed ledgers which are used by other entities and/or institutions. For example, the data dictionary may act as an electronic database that lists keys for data within a distributed ledger (such as keys associated with structure, codebases, schemas, formats, languages, protocols, and other such programming tools and terms, and/or the like) and their associated values (e.g., how the keys are used, what they purpose is, the meaning behind the keys, and/or the like). Additionally, and in some embodiments, the data dictionary may comprise values which indicate the associated keys that are equivalent between different networks and/or systems which can be used for translation from the source ledger data to a unicode distributed ledger data which is known and understood by the destination network/destination system. In this manner, the data dictionary may act as a tool for translating the source ledger data to a unicode that can be understood and processed by the system for conversion to the destination ledger.

In some embodiments, the data dictionary is generated and updated by a large language model (LLM), such as the LLM shown and described in more detail below with respect to FIG. 4. In some such embodiments, the LLM may comprise current data associated with a plurality of entity ledgers and different schemas, such that the LLM is continuously monitoring data regarding these entity ledgers and their associated data, schemas, formats, protocols, languages, and/or the like, to keep an up-to-date data dictionary for all published distributed ledger technology.

As shown in block 208, the process flow 200 may include the step of generating code mapping instructions for the cross-distributed network data transmission based on the core schema for the destination ledger. For example, the system may generate code mapping instructions for the source code ledger to map/convert to the destination ledger, whereby the code mapping instructions may comprise instructions to convert the data of the source ledger (e.g., the structure of the data, the relationships between data structures, and/or the like) to a unicode ledger (which comprises uniform or understood data structures, relationships between data structures, and/or the like, which are readily understandable and convertible to a destination ledger). In this manner, the code mapping instructions may comprise directions or commands for converting the overall format, organization, storage, and/or the like for an intermediary ledger which comprises unicode (which is described in further detail hereinbelow).

As shown in block 210, the process flow 200 may include the step of converting the source ledger code to a unicode. Such a unicode may act as a uniform datacode that can be used as a language or term translator between the source ledger and the destination ledger. In this manner, the system may identify the correct unicode for both the destination ledger and the source code based on the data dictionary described hereinabove, and use the unicode as a translation intermediary between the datacodes of the source ledger and the destination ledger. For instance, and based on the language example used above, where the source ledger comprises language A, and the destination ledger comprises language B, and where language A can be converted to language C without loss of data or information, and language B can also be converted to language C (and vice versa), then language C may act as the unicode for conversion of the underlying information spoken within the languages. In this manner, the unicode may act as a translation data code for the source ledger to the destination ledger.

Additionally, and in some embodiments, the steps described herein with respect to block 208 and 210 may occur in parallel (or at the same time) with each other, or sequentially with each other (e.g., the process described with respect to block 208 may occur before and/or after the process described with respect to block 210).

As shown in block 212, the process flow 200 may include the step of generating, by a receiver schema mapping module, an intermediary ledger comprising the unicode and based on the code mapping instructions. For instance, the system may generate an intermediary ledger comprising the unicode and based on the code mapping instructions for the unicode, whereby the intermediary ledger may act as a translation ledger between the source ledger and the destination ledger. In this manner, the intermediary ledger may comprise data (such as unicode data) generated from the codebase data of source ledger which has been translated to codebase data that is understandable and processable by the destination entity and/or system for generating the destination ledger for the destination entity and/or system. Thus, and in some embodiments, the intermediary ledger comprises an intermediary schema and the unicode that can be mapped to a destination schema and destination ledger code. Therefore, the intermediary ledger comprises translations for the source ledger schema (e.g., the intermediary schema) which may be based on the code mapping instructions, and translations for the source ledger codebase data (e.g., unicode).

In some embodiments, and where the source code comprises an application data, an application programming interface (API) call, a data request, and/or the like, and where the destination system cannot process the transmission from the application, API call, data request, and/or the like, the processes described herein may be used for processing and converting the source code to a destination code. Thus, and as understood by a person of skill in the art, the disclosure of the processes described herein are not limited to only the conversion of distributed ledgers, but are also disclosed for other such computing tools, applications, databases, and/or the like.

As shown in block 214, the process flow 200 may include the step of automatically converting the intermediary ledger to the destination ledger. For example, and upon generating the intermediary ledger, the system may automatically generate the destination ledger based on the source ledger, and based on the translation provided by the intermediary ledger. In some embodiments, the automatic conversion may occur based on the system generation of the intermediary ledger acting as a trigger, itself. Additionally, and in some embodiments, the system may generate just the intermediary ledger and transmit the intermediary ledger to the destination entity/destination network for the destination entity system to generate its own destination ledger. In this manner, the system and processes described herein may act independently of the destination ledger.

As used herein, and by way of example, once the translation of the source ledger to the intermediary ledger, the system (and/or the destination system) may use the intermediary ledger as a intermediary ledger as a processable translation of the source ledger. In this manner, and based on the example provided above with respect to language A, language B, and language C, once language A has been translated to language C, then the destination or recipient of the information in language A may translate the information in language C to its language B.

FIG. 3 illustrates a process flow 300 for determining whether the cross-distributed network data transmission is internal or external and the conversion of the source ledger code based on the determination, in accordance with an embodiment of the disclosure. In some embodiments, a system (e.g., similar to one or more of the systems described herein with respect to FIGS. 1A-1C) may perform one or more of the steps of process flow 300. For example, a system (e.g., the system 130 described herein with respect to FIG. 1A-1C) may perform the steps of process flow 300.

In some embodiments, and as shown in block 302, the process flow 300 may include the step of determining whether the cross-distributed network data transmission is an internal data category or an external data category. For example, the system may determine whether the cross-distributed network data transmission (e.g., the source ledger of the cross-distributed network data transmission) was generated within the same network that the destination ledger is generated, and in the instance where the cross-distributed network data transmission was generated in the same network, the system may determine that the cross-distributed network data transmission is an internal data category. In contrast, and where the cross-distributed network data transmission (e.g., the source ledger of the cross-distributed network data transmission) was generated outside of the same network comprising the destination ledger, then the system will determine that the cross-distributed network data transmission is an external data category.

Based on the determination that the cross-distributed network data transmission is an internal data category, the process flow 300 may continue either to block 304 and/or to block 204 of FIG. 2. For instance, and as shown in block 304, the process flow 300 may include the step of performing a local conversion of the source ledger code using the ledger transformation module comprising the code mapping instructions when the cross-distributed network data transmission is an internal data category.

In some embodiments, and as shown in block 304, the process flow 300 may include the step of performing a local conversion of the source ledger code using the ledger transformation module comprising the code mapping instructions. Such a process for internal data category may be streamlined when the cross-distributed network data transmission is an internal data category as it allows the system to use its own already known information for generating converting the source ledger to the destination ledger (e.g., the process has already been completed at least once before, the codebases are already known and understood within the system network, the schemas, format, languages, protocols, and/or the like, have already been processed within the system's network, and/or the like).

FIG. 4 illustrates an exemplary architecture flow 400 for dynamically generate and map unicode for cross-distributed network data transmissions. In some embodiments, a system (e.g., similar to one or more of the systems described herein with respect to FIGS. 1A-1C) may perform one or more of the steps of architecture flow 400. For example, a system (e.g., the system 130 described herein with respect to FIG. 1A-1C) may perform the steps of architecture flow 400.

As shown in architecture flow 400, the process for cross-distributed network data transmissions may begin (e.g., step 1) with a determination of a data category based on an application monitoring of data transmissions (such as a transmission of a distributed ledger or a source ledger). Such a data category may comprise an internal fetch (i.e., an internal data category) or an exchange bound (i.e., an external data category), which will determine how the cross-distributed network data transmission is treated for converting to a destination or recipient system. For instance, and where the data category is an internal data category, the system may streamline its conversion of the source data and associated structures, format, language, protocols, and/or the like, based on previous conversions within the network. For example, and where the system/network has previously converted the data written in the same language, format, organized in the same structure(s), protocols, and/or the like, then the system may know without having to undergo the rest of the processes described herein, and instead may continue with destination mapping directly to the destination ledger.

In some embodiments, and in the instance where the data category is an external data category, the system may determine whether there is schema compatibility between the source and the destination (as shown as step 2 in the architecture flow 200). Such a schema compatibility may determine whether the destination system is configured to receive the source data, which may be based on a subscription via an API call, or other such subscription or expectation on the part of the destination system that the source data should be sent and received. In some such embodiments, the determination of the schema compatibility may be determined by a trigger and/or message sent from the destination system that the source data is expected and/or requested.

Additionally, and as shown as step 3 in the architecture flow 400, the process may continue to receiving data from a large language model (LLM) which is configured to access and/or request data regarding current technology used by other entities (or in some instances, financial instances). For instance, and where the source data comprises a source ledger, the LLM may be configured to access data regarding other entities' distributed ledger technology (e.g., languages used, formats used, protocols used, structures used, schemas used, and/or the like). In this manner, the LLM may collect published data from the entities' themselves, from webcrawlers crawling websites and other such databases, to access this information. Upon collecting such information, the LLM may be configured to transmit the collected data to a ledger transformation module, which is configured to swap native data codes and generate mapping instructions, which acts to generate the underlying framework for the source ledger based on the data collected and known by the LLM. In this manner, the LLM's collected data may be used by the system to determine the underlying framework (in order to build the framework knowledge shown in the knowledge change component of architecture flow 400) that should be used for converting the source ledger to the destination ledger.

As shown in step 4 of architecture flow 400, the system may continue from building the framework knowledge to applying the framework knowledge to the source data (e.g., source ledger) by applying the mapping instructions and the generating the unicode. Additionally, and while the system is following the process described herein, the system may also build a parent pool, which may act as a central database of each of the ledger technologies used by these entities' and how to convert from the source ledgers comprising these technology features to destination-supported technology (e.g., format, language, schema, structure, and/or the like). Additionally, and upon generating the unicode and the mapping instructions, the system may continue to the ledger transformation module (step 5) which may actually apply both the unicode and the mapping instructions to organize the unicode to the proper schema, format, language, and/or the like for the mapping instructions to create an equivalent intermediary ledger to the source ledger.

Lastly, and as shown in step 6 of architecture flow 400, the system may use the generated intermediary ledger to automatically generate the destination ledger in an efficient, automatic, and dynamic method, without losing the underlying data or structure of the source ledger.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for dynamically generating and mapping Unicode for cross-distributed network data transmissions, the system comprising:
    a processing device;
    a non-transitory storage device containing instructions when executed by the processing device, causes the processing device to perform the steps of:
        identify a cross-distributed network data transmission comprising source ledger code;
        generate a core schema for a destination ledger, wherein the destination ledger is based on data of the cross-distributed network data transmission;
        generate, by a ledger transformation module, a data dictionary, wherein the ledger transformation module receives ledger code from a large language model (LLM);
        generate code mapping instructions for the cross-distributed network data transmission based on the core schema for the destination ledger;
        convert the source ledger code to a unicode;
        generate, by a receiver schema mapping module, an intermediary ledger comprising the unicode and based on the code mapping instructions; and
        automatically convert the intermediary ledger to the destination ledger.

2. The system of claim 1, wherein the cross-distributed network data transmission is between a source ledger and the destination ledger, and wherein the source ledger and the destination ledger comprise different schemas.

3. The system of claim 2, wherein the processing device is further configured to perform the steps of:
    determine whether a source ledger schema and a destination ledger schema are compatible.

4. The system of claim 1, wherein the processing device is further configured to perform the steps of:
    determine whether the cross-distributed network data transmission is an internal data category or an external data category.

5. The system of claim 4, wherein in an instance where the cross-distributed network data transmission is the internal data category, and wherein the processing device is further configured to perform the steps of:
    perform a local conversion of the source ledger code using the ledger transformation module comprising the code mapping instructions.

6. The system of claim 1, wherein the LLM comprises current data associated with a plurality of entity ledgers and different schemas.

7. The system of claim 1, wherein the intermediary ledger comprises an intermediary schema and the unicode that can be mapped to a destination schema and destination ledger code.

8. A computer program product for automatically generating and implementing password rotations using artificial intelligence, the computer program product comprising a non-transitory computer-readable medium comprising code causing an apparatus to:
    identify a cross-distributed network data transmission comprising source ledger code;
    generate a core schema for a destination ledger, wherein the destination ledger is based on data of the cross-distributed network data transmission;
    generate, by a ledger transformation module, a data dictionary, wherein the ledger transformation module receives ledger code from a large language model (LLM);
    generate code mapping instructions for the cross-distributed network data transmission based on the core schema for the destination ledger;
    convert the source ledger code to a unicode;
    generate, by a receiver schema mapping module, an intermediary ledger comprising the unicode and based on the code mapping instructions; and
    automatically convert the intermediary ledger to the destination ledger.

9. The computer program product of claim 8, wherein the cross-distributed network data transmission is between a source ledger and the destination ledger, and wherein the source ledger and the destination ledger comprise different schemas.

10. The computer program product of claim 9, wherein the code further causes the apparatus to
    determine whether a source ledger schema and a destination ledger schema are compatible.

11. The computer program product of claim 8, wherein the code further causes the apparatus to:
    determine whether the cross-distributed network data transmission is an internal data category or an external data category.

12. The computer program product of claim 11, wherein in an instance where the cross-distributed network data transmission is the internal data category, and wherein the processing device is further configured to perform the steps of:
    perform a local conversion of the source ledger code using the ledger transformation module comprising the code mapping instructions.

13. The computer program product of claim 8, wherein the LLM comprises current data associated with a plurality of entity ledgers and different schemas.

14. The computer program product of claim 8, wherein the intermediary ledger comprises an intermediary schema and the unicode that can be mapped to a destination schema and destination ledger code.

15. A computer-implemented method for automatically generating and implementing password rotations using artificial intelligence, the computer-implemented method comprising:
- identifying a cross-distributed network data transmission comprising source ledger code;
- generating a core schema for a destination ledger, wherein the destination ledger is based on data of the cross-distributed network data transmission;
- generating, by a ledger transformation module, a data dictionary, wherein the ledger transformation module receives ledger code from a large language model (LLM);
- generating code mapping instructions for the cross-distributed network data transmission based on the core schema for the destination ledger;
- convert the source ledger code to a unicode;
- generate, by a receiver schema mapping module, an intermediary ledger comprising the unicode and based on the code mapping instructions; and
- automatically converting the intermediary ledger to the destination ledger.

16. The computer-implemented method of claim 15, wherein the cross-distributed network data transmission is between a source ledger and the destination ledger, and wherein the source ledger and the destination ledger comprise different schemas.

17. The computer-implemented method of claim 16, further comprising:
- determining whether a source ledger schema and a destination ledger schema are compatible.

18. The computer-implemented method of claim 15, further comprising:
- determining whether the data transmission exchange is an internal data category or an external data category.

19. The computer-implemented method of claim 18, wherein in an instance where the cross-distributed network data transmission is the internal data category, and wherein the computer-implemented method further comprises:
- performing a local conversion of the source ledger code using the ledger transformation module comprising the code mapping instructions.

20. The computer-implemented method of claim 15, wherein the LLM comprises current data associated with a plurality of entity ledgers and different schemas.

* * * * *